(12) United States Patent
    Clingman

(10) Patent No.: US 11,602,687 B2
(45) Date of Patent: Mar. 14, 2023

(54) MEDIA-OBJECT BINDING FOR PREDICTING PERFORMANCE IN A MEDIA

(71) Applicant: Sony Interactive Entertainment Inc., Tokyo (JP)

(72) Inventor: Dustin Shawn Clingman, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 140 days.

(21) Appl. No.: 16/885,635

(22) Filed: May 28, 2020

(65) Prior Publication Data

US 2021/0370169 A1    Dec. 2, 2021

(51) Int. Cl.
| | |
|---|---|
| A63F 9/24 | (2006.01) |
| A63F 11/00 | (2006.01) |
| G06F 13/00 | (2006.01) |
| G06F 17/00 | (2019.01) |
| A63F 13/46 | (2014.01) |
| H04N 21/2187 | (2011.01) |
| A63F 13/50 | (2014.01) |
| H04N 21/84 | (2011.01) |
| H04N 21/845 | (2011.01) |

(52) U.S. Cl.
CPC .............. *A63F 13/46* (2014.09); *A63F 13/50* (2014.09); *H04N 21/2187* (2013.01); *H04N 21/84* (2013.01); *H04N 21/8456* (2013.01)

(58) Field of Classification Search
CPC ............................ G07F 17/32; G07F 17/3211
USPC ............... 463/1, 20, 22, 25, 30, 31
See application file for complete search history.

(56) References Cited

U.S. PATENT DOCUMENTS

| | | |
|---|---|---|
| 5,913,013 A | 6/1999 | Abecassis |
| 8,448,095 B1 | 5/2013 | Haussila et al. |
| 8,460,108 B2 | 6/2013 | Hendrickson et al. |
| 8,764,555 B2 | 7/2014 | Quan et al. |
| 8,918,728 B2 | 12/2014 | Hamilton et al. |
| 9,155,963 B2 | 10/2015 | Baynes et al. |

(Continued)

FOREIGN PATENT DOCUMENTS

| | | |
|---|---|---|
| CN | 113710337 | 11/2021 |
| CN | 113710340 | 11/2021 |

(Continued)

OTHER PUBLICATIONS

PCT Application No. PCT/US2020/054603 International Search Report and Written Opinion dated Jan. 28, 2021.

(Continued)

*Primary Examiner* — Adetokunbo O Torimiro
(74) *Attorney, Agent, or Firm* — Polsinelli LLP

(57) ABSTRACT

A system and method for media-object binding and predicting performance in a media is provided. One or more sets of object data may be associated with the media. One or more media-object bindings between the one or more sets of object data and the media may be formed and stored in one or more databases. The one or more sets of object data may include data about an object displayed during at least the portion of the media. One or more object-object associations between the one or more sets of object data and other stored object data may be formed and stored the one or more databases. The one or more object-object associations may form one or more object aggregations. A determination may for made regarding if any of the one or more object aggregations meet or pass a threshold.

25 Claims, 5 Drawing Sheets

(56) References Cited

U.S. PATENT DOCUMENTS

| | | |
|---|---|---|
| 9,168,460 B2 | 10/2015 | Pearce |
| 9,333,433 B2 | 5/2016 | Cotter |
| 9,381,425 B1 | 7/2016 | Curtis et al. |
| 9,468,851 B1 | 10/2016 | Pieron |
| 9,795,879 B2 | 10/2017 | Colenbrander |
| 10,109,003 B1 | 10/2018 | Jenkins et al. |
| 10,564,820 B1 | 2/2020 | Cabanero et al. |
| 10,569,164 B1 | 2/2020 | Bleasdale-Shepherd |
| 10,843,085 B2 | 11/2020 | Stephens |
| 10,848,805 B1 | 11/2020 | Mattar et al. |
| 10,881,962 B2 | 1/2021 | Stephens |
| 11,080,748 B2 | 8/2021 | Stephens |
| 11,090,568 B1 | 8/2021 | Mattar et al. |
| 11,213,748 B2 | 1/2022 | Jarzebinski |
| 11,247,130 B2 | 2/2022 | Stephens |
| 11,269,944 B2 | 3/2022 | Stephens |
| 11,420,130 B2 | 8/2022 | Clingman |
| 11,442,987 B2 | 9/2022 | Clingman |
| 11,465,053 B2 | 10/2022 | Stephens |
| 2002/0077170 A1 | 6/2002 | Johnson et al. |
| 2002/0183105 A1 | 12/2002 | Cannon et al. |
| 2004/0021684 A1 | 2/2004 | Millner |
| 2007/0198740 A1 | 8/2007 | Peters et al. |
| 2007/0198939 A1 | 8/2007 | Gold |
| 2008/0045335 A1 | 2/2008 | Garbow et al. |
| 2008/0262858 A1 | 10/2008 | Broady et al. |
| 2009/0115776 A1 | 5/2009 | Bimbra et al. |
| 2009/0170609 A1 | 7/2009 | Kang et al. |
| 2009/0176557 A1 | 7/2009 | Hall et al. |
| 2009/0197681 A1 | 8/2009 | Krishnamoorthy et al. |
| 2009/0276713 A1 | 11/2009 | Eddy |
| 2010/0070613 A1 | 3/2010 | Chen et al. |
| 2010/0105484 A1 | 4/2010 | Horneff et al. |
| 2010/0304348 A1 | 12/2010 | Lehavi |
| 2011/0067061 A1 | 3/2011 | Karaoguz et al. |
| 2011/0092282 A1 | 4/2011 | Gary |
| 2011/0113149 A1 | 5/2011 | Kaal |
| 2011/0250971 A1 | 10/2011 | van Os et al. |
| 2011/0314029 A1 | 12/2011 | Fischer et al. |
| 2011/0319229 A1 | 12/2011 | Corbalis et al. |
| 2012/0004956 A1 | 1/2012 | Huston et al. |
| 2012/0030123 A1 | 2/2012 | Ocko |
| 2012/0094762 A1 | 4/2012 | Khan |
| 2012/0115580 A1 | 5/2012 | Homik et al. |
| 2012/0206574 A1 | 8/2012 | Shikata et al. |
| 2012/0252583 A1 | 10/2012 | Mikkelsen |
| 2012/0284292 A1 | 11/2012 | Rechsteiner et al. |
| 2012/0309533 A1 | 12/2012 | Horita et al. |
| 2012/0317198 A1 | 12/2012 | Patton et al. |
| 2012/0322561 A1 | 12/2012 | Kohlhoff |
| 2013/0064527 A1 | 3/2013 | Maharajh et al. |
| 2013/0084969 A1 | 4/2013 | Knoles et al. |
| 2013/0086484 A1 | 4/2013 | Antin et al. |
| 2013/0165234 A1 | 6/2013 | Hall et al. |
| 2013/0190094 A1 | 7/2013 | Ronen et al. |
| 2013/0212342 A1 | 8/2013 | McCullough et al. |
| 2013/0244785 A1 | 9/2013 | Gary |
| 2014/0080601 A1 | 3/2014 | Knutsson |
| 2014/0129322 A1 | 5/2014 | George et al. |
| 2014/0179440 A1 | 6/2014 | Perry |
| 2014/0199045 A1 | 7/2014 | Lee et al. |
| 2014/0204014 A1 | 7/2014 | Thorn et al. |
| 2014/0206456 A1 | 7/2014 | Koplar |
| 2014/0228112 A1 | 8/2014 | Laakkonen et al. |
| 2014/0235338 A1 | 8/2014 | Hansson et al. |
| 2014/0243097 A1 | 8/2014 | Yong et al. |
| 2014/0243098 A1 | 8/2014 | Yong et al. |
| 2014/0274297 A1 | 9/2014 | Lewis et al. |
| 2014/0364210 A1 | 12/2014 | Murray et al. |
| 2015/0026728 A1 | 1/2015 | Carter et al. |
| 2015/0081777 A1 | 3/2015 | Laine et al. |
| 2015/0094139 A1 | 4/2015 | Kargar |
| 2015/0142799 A1 | 5/2015 | Eronen et al. |
| 2015/0224396 A1 | 8/2015 | Okada |
| 2015/0245084 A1 | 8/2015 | Downing et al. |
| 2015/0296250 A1 | 10/2015 | Casper |
| 2015/0306499 A1 | 10/2015 | Chimes et al. |
| 2015/0331856 A1 | 11/2015 | Choi et al. |
| 2015/0381689 A1 | 12/2015 | Ganesh et al. |
| 2016/0005326 A1 | 1/2016 | Syrmis et al. |
| 2016/0029153 A1 | 1/2016 | Linn et al. |
| 2016/0078471 A1 | 3/2016 | Hamedi |
| 2016/0147890 A1 | 5/2016 | Wissner et al. |
| 2016/0149956 A1 | 5/2016 | Birnbaum et al. |
| 2016/0277349 A1 | 9/2016 | Bhatt et al. |
| 2016/0287997 A1 | 10/2016 | Laakkonen et al. |
| 2016/0350813 A1 | 12/2016 | Balasubramanian et al. |
| 2016/0366483 A1 | 12/2016 | Joyce et al. |
| 2017/0001111 A1 | 1/2017 | Willette et al. |
| 2017/0001122 A1 | 1/2017 | Leung et al. |
| 2017/0050111 A1 | 2/2017 | Perry et al. |
| 2017/0087460 A1 | 3/2017 | Perry |
| 2017/0126757 A1 | 5/2017 | Kuo et al. |
| 2017/0157512 A1 | 6/2017 | Long et al. |
| 2017/0188116 A1 | 6/2017 | Major et al. |
| 2017/0189815 A1 | 7/2017 | Tweedale et al. |
| 2017/0301041 A1 | 10/2017 | Schneider |
| 2017/0339093 A1 | 11/2017 | Pesavento et al. |
| 2017/0354888 A1 | 12/2017 | Benedetto et al. |
| 2018/0001194 A1 | 1/2018 | Sherwani et al. |
| 2018/0001216 A1 | 1/2018 | Bruzzo et al. |
| 2018/0014077 A1 | 1/2018 | Hou et al. |
| 2018/0021684 A1 | 1/2018 | Benedetto |
| 2018/0033250 A1 | 2/2018 | O'Heeron et al. |
| 2018/0101614 A1 | 4/2018 | Kuipers et al. |
| 2018/0126279 A1 | 5/2018 | Stelovsky et al. |
| 2018/0192142 A1 | 7/2018 | Paul |
| 2018/0295175 A1 | 10/2018 | Smith et al. |
| 2018/0318708 A1 | 11/2018 | Rom et al. |
| 2018/0343505 A1 | 11/2018 | Loheide et al. |
| 2018/0359477 A1 | 12/2018 | Yang |
| 2019/0052471 A1 | 2/2019 | Panattoni et al. |
| 2019/0208242 A1 | 7/2019 | Bates et al. |
| 2019/0246149 A1 | 8/2019 | Reza et al. |
| 2019/0282906 A1 | 9/2019 | Yong |
| 2019/0297376 A1 | 9/2019 | McCarty et al. |
| 2020/0061465 A1 | 2/2020 | Benedetto et al. |
| 2020/0101382 A1 | 4/2020 | Wheeler et al. |
| 2020/0111306 A1 | 4/2020 | Oberberger et al. |
| 2020/0114267 A1 | 4/2020 | Sakurai |
| 2020/0147489 A1 | 5/2020 | Mahlmeister et al. |
| 2020/0169793 A1 | 5/2020 | Akerfeldt |
| 2020/0184041 A1 | 6/2020 | Andon et al. |
| 2020/0188781 A1 | 6/2020 | Stephens |
| 2020/0188792 A1 | 6/2020 | Stephens |
| 2020/0188794 A1 | 6/2020 | Stephens |
| 2020/0188796 A1 | 6/2020 | Stephens |
| 2020/0188800 A1 | 6/2020 | Stephens |
| 2020/0192929 A1 | 6/2020 | Stephens |
| 2020/0193476 A1 | 6/2020 | Stephens |
| 2020/0193477 A1 | 6/2020 | Stephens |
| 2021/0077907 A1 | 3/2021 | Stephens |
| 2021/0129023 A1 | 5/2021 | Jarzebinski |
| 2021/0370185 A1 | 12/2021 | Clingman |
| 2021/0374180 A1 | 12/2021 | Clingman |
| 2022/0143516 A1 | 5/2022 | Thielbar |
| 2022/0193546 A1 | 6/2022 | Jarzebinski |
| 2022/0401845 A1 | 12/2022 | Clingman |

FOREIGN PATENT DOCUMENTS

| | | |
|---|---|---|
| CN | 113727764 | 11/2021 |
| CN | 113727765 | 11/2021 |
| CN | 114599432 | 6/2022 |
| EP | 3894030 | 10/2021 |
| EP | 3894032 | 10/2021 |
| JP | 2017-182603 | 10/2017 |
| JP | 2022-512425 | 2/2022 |
| JP | 2022-512492 | 2/2022 |
| JP | 2022-513485 | 2/2022 |
| JP | 2022-513849 | 2/2022 |
| KR | 2018-0094833 | 8/2018 |
| WO | WO 2009/094611 | 7/2009 |
| WO | WO 2014/047490 | 3/2014 |

(56) References Cited

FOREIGN PATENT DOCUMENTS

| WO | WO 2017/182642 | 10/2017 |
|---|---|---|
| WO | WO 2017/188677 | 11/2017 |
| WO | WO 2020/123115 | 6/2020 |
| WO | WO 2020/123116 | 6/2020 |
| WO | WO 2020/123117 | 6/2020 |
| WO | WO 2020/123118 | 6/2020 |
| WO | WO 2021/086561 | 5/2021 |
| WO | WO 2021/242476 | 12/2021 |
| WO | WO 2021/242477 | 12/2021 |
| WO | WO 2021/242478 | 12/2021 |
| WO | WO 2022/098707 | 5/2022 |

OTHER PUBLICATIONS

U.S. Appl. No. 16/220,465 Final Office Action dated Dec. 24, 2020.
U.S. Appl. No. 16/358,546 Final Office Action dated Jan. 27, 2021.
Li et al., "Distributed Multimedia Systems", IEEE, Jul. 1997, retrieved on [Feb. 7, 2021], Retrieved from the internet <URL: https://citeseerx.ist.psu.edu/viewdoc/download?doi=10.1.1.128.9759&rep1&type=pdf>.
PCT Application No. PCT/US2019/062602 International Preliminary Report on Patentability dated Jun. 8, 2021.
PCT Application No. PCT/US2019/062606 International Preliminary Report on Patentability dated Jun. 8, 2021.
PCT Application No. PCT/US2019/062613 International Preliminary Report on Patentability dated Jun. 8, 2021.
PCT Application No. PCT/US2019/062626 International Preliminary Report on Patentability dated Jun. 8, 2021.
PCT Application No. PCT/US2021/030378 International Search Report and Written Opinion dated Aug. 5, 2021.
PCT Application No. PCT/US2021/030379 International Search Report and Written Opinion dated Aug. 5, 2021.
PCT Application No. PCT/US2021/030380 International Search Report and Written Opinion dated Aug. 12, 2021.
U.S. Appl. No. 16/359,160 Office Action dated Jul. 12, 2021.
U.S. Appl. No. 16/220,443 Office Action dated Aug. 6, 2021.
U.S. Appl. No. 16/220,465 Office Action dated Jul. 26, 2021.
U.S. Appl. No. 16/358,546 Office Action dated Jun. 23, 2021.
U.S. Appl. No. 16/220,397 Office Action dated Sep. 25, 2020.
U.S. Appl. No. 16/359,160 Office Action dated Nov. 13, 2020.
U.S. Appl. No. 16/220,443 Office Action dated Oct. 19, 2020.
U.S. Appl. No. 16/379,683 Office Action dated Nov. 6, 2020.
PCT Application No. PCT/US2019/062626 International Search Report and Written Opinion dated Jan. 29, 2020.
PCT Application No. PCT/US2019/062606 International Search Report and Written Opinion dated Jan. 30, 2020.
PCT Application No. PCT/US2019/062613 International Search Report and Written Opinion dated Feb. 3, 2020.
PCT Application No. PCT/US2019/062602 International Search Report and Written Opinion dated Feb. 14, 2020.
U.S. Appl. No. 16/220,460 Office Action dated Jan. 28, 2020.
U.S. Appl. No. 16/380,760 Office Action dated Mar. 6, 2020.
U.S. Appl. No. 16/220,465 Office Action dated Jun. 15, 2020.
U.S. Appl. No. 16/358,546 Office Action dated May 20, 2020.
U.S. Appl. No. 17/102,881, Mischa Stephens, Media-Activity Binding and Content Blocking, Nov. 24, 2020.
U.S. Appl. No. 16/679,795, Alexander Jarzebinski, Content Streaming With Gameplay Launch, Nov. 11, 2019.
PCT/US20/54603, Content Streaming With Gameplay Launch, Oct. 7, 2020.
U.S. Appl. No. 16/359,160 Final Office Action dated Mar. 12, 2021.
U.S. Appl. No. 16/220,443 Final Office Action dated Apr. 13, 2021.
U.S. Appl. No. 16/379,683 Final Office Action dated May 7, 2021.
U.S. Appl. No. 16/679,795 Office Action dated May 10, 2021.
PCT Application No. PCT/US2021/057832 International Search Report and Written Opinion dated Feb. 16, 2022.
U.S. Appl. No. 16/358,546 Final Office Action dated Nov. 1, 2021.
PCT Application No. PCT/US2020/054603 International Preliminary Report on Patentability dated May 2, 2022.
Application No. 19896349.8 Extended European search report dated Jul. 5, 2022.
U.S. Appl. No. 17/517,875 Office Action dated Oct. 13, 2022.
Application No. 19896543.6 Extended European search report dated Aug. 12, 2022.
Application No. 19895486.9 Extended European search report dated Oct. 5, 2022.
Application No. 19897134.3 Extended European search report dated Oct. 5, 2022.
PCT Application No. PCT/US2021/030378 International Preliminary Report on Patentability dated Nov. 17, 2022.
PCT Application No. PCT/US2021/030379 International Preliminary Report on Patentability dated Nov. 17, 2022.
PCT Application No. PCT/US2021/030380 International Preliminary Report on Patentability dated Nov. 17, 2022.
U.S. Appl. No. 16/358,546 Final Office Action dated Dec. 30, 2022.
U.S. Appl. No. 17/566,964 Office Action dated Nov. 23, 2022.

MEDIA-OBJECT BINDING FOR PREDICTING PERFORMANCE IN A MEDIA

BACKGROUND

1. Technical Field

The present technology pertains to prediction in a media. More specifically, the present technology may provide for predicting performance and measuring performance acceleration or velocity of media using media-object binding.

2. Background

Gaming media is an increasingly popular and growing information source for game players. Such gaming media (e.g., from a game publisher or game-related content created by peer players) may incentivize further gameplay, promote new features of a game or a new game, or provide gameplay help. Presently available gaming media may include media or live-streaming media broadcasted to one or more viewers (e.g., live-streaming media), which may feature another player broadcasting their gameplay in a live-streaming media. Viewers may have a particular interest in find exciting content in streaming media with live-broadcast gameplay wherein the player is about to accomplish a record-breaking feat or some exciting accomplishment. However, more often than not, viewers end up finding such recorded content after the fact because there was no method of predicting performance in media.

There is, therefore, a need in the art for systems and methods for predicting performance and measure performance acceleration of media.

SUMMARY

Aspects of the present disclosure include systems and methods for media-object binding and predicting performance in a media. One or more sets of object data may be associated with the media and may further be stored in memory. The media (e.g., user-generated content or publisher content) may depict an object. The media may be a live-streaming media. The media may have a length of time. The one or more sets of object data may include information about an associated aspect displayed in the media, which may be associated with other objects associated with a common activity displayed in the media. The one or more sets of object data may include at least one timestamp corresponding to time within the media. The one or more sets of object data may include data about an object type, object information, such as changes available for activities, whether activities started or ended, activities most recently started, location change of a user, actor (e.g., an entity with behavior in the game, user-controlled or game-controlled) information, and mechanic (e.g., objects and abilities that impact gameplay) information.

The one or more sets of object data may be associated with a media. One or more associations between the one or more sets of object data and the media may be formed and stored in memory, such as one or more databases. Each set of object data may include data about an associated object displayed during at least a portion of the media. One or more media-object bindings between the one or more sets of object data and the media may be formed and stored in one or more databases. One or more object-object associations between the one or more sets of object data and other stored data may be formed and stored in the one or more databases. The one or more object-object associations may form one or more object aggregations. Then, a determination of whether or not any of the one or more object aggregations met or passed a threshold may be made. When the set threshold is met or passed, the media may suggest to an associated user to stream the media in real-time if the media is not a live-streaming media.

Various aspects of the present disclosure may include methods for media-activity binding and predicting performance in a media. Such methods may include as associating one or more sets of activity data with the media, wherein the one or more sets of object data comprises data about an object displayed during in at least a portion of the media. Such methods may include forming and storing one or more media-object bindings between the one or more sets of object data and the media in one or more databases. Such methods may include forming and storing one or more object-object associations between the one or more sets of object data and other stored object data in the one or more databases, wherein object-object associations form one or more object aggregations. Such methods may include determining if any of the one or more object aggregations meet or pass a threshold.

Additional aspects of the present disclosure may include systems for media-object binding and predicting performance in a media. Such systems may include memory that stores media, one or more sets of object data, and associates between the media and the one or more sets of object data. Each set of object data may include data about an aspect displayed during at least a portion of the media. Such system may include one or more processors that executes instructions stored in memory. Execution of the instructions by the one or more processors may associate one or more sets of object data with at least a portion of the media. Execution of the instructions by the one or more processors may form and store one or more media-object bindings between the one or more sets of object data and the media in one or more databases. Execution of the instructions by the one or more processors may form and store one or more object-object associations between the one or more sets of object data and other stored data in the one or more databases. The one or more object-object associations may form one or more object aggregations. Execution of the instructions by the one or more processors may determine if any of the one or more object aggregations meets or passes a threshold.

Further aspects of the present disclosure include non-transitory computer-readable medium or storage media having embodied thereon a program executable by a processor to provide a method for predicting performance in a media.

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Aspects of the present disclosure include systems and methods for predicting performance and measuring performance acceleration or velocity in a media using media-object binding (e.g., providing list results for streaming media displaying a shared object). A media and one or more sets of object data associated with the media may be stored in memory. The one or more sets of object data may be associated with the media. One or more media-object bindings between the one or more sets of object data and the portion of the streaming media may be stored in memory. Each set of object data may include data about an aspect displayed during at least the portion of the streaming media. The media-object bindings between the one or more sets of object data and the media may be formed in one or more databases. One or more object-object associations between the one or more sets of object data and other stored object data maybe formed and stored in the one or more database. The one or more object associations may form one or more object aggregations. Then a determination if any object aggregation meets or passes a threshold may be made.

Figure 1:
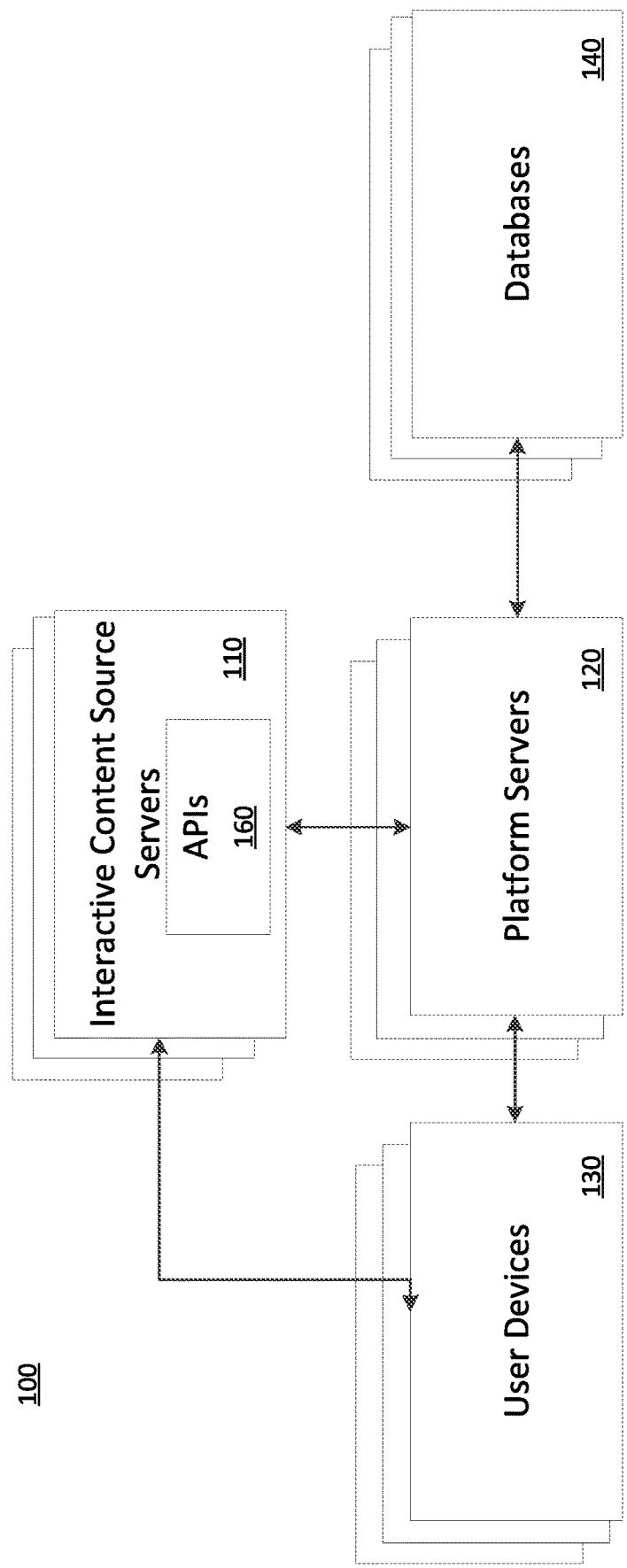
FIG. 1 illustrates an example network environment in which a system for predicting performance and measuring performance acceleration or velocity in a media using media-object binding may be implemented, according to an aspect of the present disclosure.

FIG. 1 illustrates an exemplary network environment 100 in which a system for predicting performance and measuring performance acceleration or velocity in a media using media-object binding. The network environment 100 may include one or more media streaming servers 110 that provide streaming content (e.g., interactive video, podcasts, etc.), one or more platform servers 120, one or more user devices 130, and one or more databases 140.

Media streaming servers 110 may maintain, stream, and host interactive media available to stream on a user device 130 over a communication network. Such media streaming servers 110 may be implemented in the cloud (e.g., one or more cloud servers). Each media may include one or more sets of object data that may be available for participation with (e.g., viewing or interacting with an activity) by a user. Data about the object shown in the media may be stored by the media streaming servers 110, platform servers 120 and/or the user device 130, in an object file 216, as will be discussed in detail with respect to FIGS. 2A and 3.

The platform servers 120 may be responsible for communicating with the different media streaming servers 110, databases 140, and user devices 130. Such platform servers 120 may be implemented on one or more cloud servers. The streaming servers 110 may communicate with multiple platform servers 120, though the media streaming servers 110 may be implemented on one or more platform servers 120. The platform servers 120 may also carry out instructions, for example, receiving a user request from a user to stream media (i.e., games, activities, video, podcasts, User Generated Content, publisher content, etc.). The platform servers 120 may further carry out instructions, for example, for streaming the media content titles. Such media may have at least one object set associated with the media. Each set of object data may have data about an object (e.g., activity information, zone information, actor information, mechanic information, game media information, etc.) displayed during at least a portion of the media content.

The media and the associated one or more sets of object data may be provided through an application programming interface (API) 160, which allows various types of media streaming servers 110 to communicate with different platform servers 120 and different user devices 130. API 160 may be specific to the particular computer programming language, operating system, protocols, etc., of the media streaming servers 110 providing the streaming media content titles, the platform servers 120 providing the media and the associated one or more sets of object data, and user devices 130 receiving the same. In a network environment 100 that includes multiple different types of media streaming servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). An exemplary user device 130 is described in detail herein with respect to FIG. 4.

The databases 140 may be stored on the platform server 120, the media streaming servers 110, any of the servers 218 (shown in FIG. 2A), on the same server, on different servers, on a single server, across different servers, or on any of the user devices 130. Such databases 140 may store media and an associated set of object data. Such media may depict one or more activities that a user can participate in and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC. One or more user profiles may also be stored in the databases 140. Each user profile may include information about the user (e.g., user progress in an activity and/or media content title, user id, user game characters, etc.) and may be associated to media.

Figure 2A:
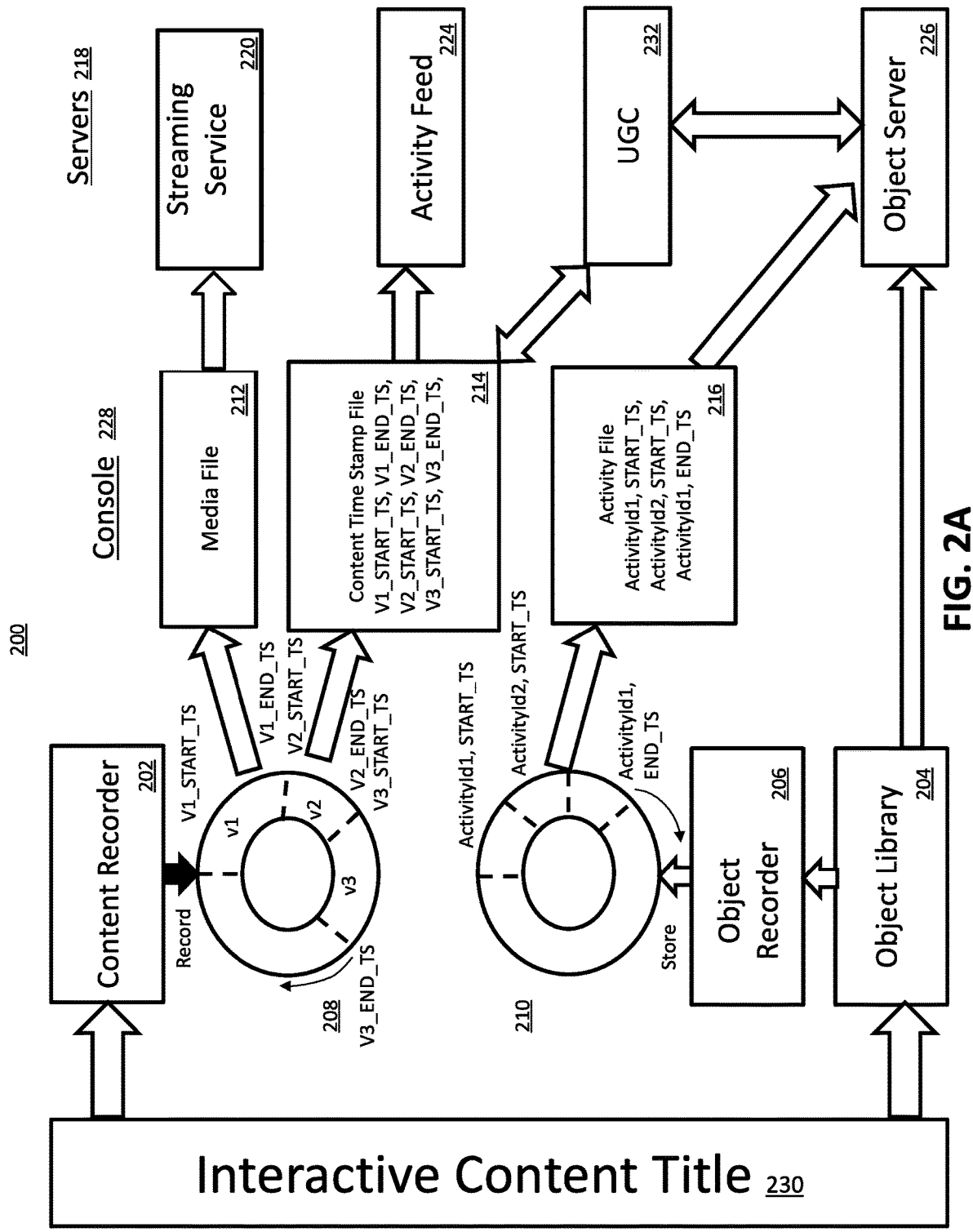
FIG. 2A illustrates a detailed example network in which a system for binding data from a universal data system to user generated content may be implemented, according to an aspect of the present disclosure.

In the exemplary network environment 200 of FIG. 2A, an exemplary console 228 (e.g., a user device 130) and exemplary servers 218 (e.g., streaming server 220, an activity feed server 224, an UGC server 232, and an object server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, an object library 204 receives data from the interactive content title 230, and an object recorder 206 tracks the data to determine when an object beings and ends. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the acitivity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 216, 214.

Figure 2B:
FIG. 2B illustrates an example table of various objects and associated events, according to an aspect of the present disclosure.

As shown in the exemplary table 250 of FIG. 2B, such object data (e.g., the object file 216) may be associated with event information regarding activity availability change and may be related to other objects with associated event information. For example, such object data may be zone data files 252, actor data files 254, mechanics data files 256, game media data files 258, and other gameplay-related data files.

Such object data (e.g., the object file 216) may be categorized as in in progress, open-ended, or competitive. Such activity data files 216 may include optional properties, such as a longer description of the activity, an image associated with the activity, if the activity is available to players before launching the game, whether completion of the activity is required to complete the game, whether the activity can be played repeatedly in the game, and whether there are nested tasks or associated child activities. Such activity data files 216 may include an activity availability change event for, which may indicate a list or array of currently available activities for the player. For example, this may be used to decide what activities to display in a game plan.

Such zone data files 252 may indicate an area of an associated game world with a single coordinate system wherein the zone may have a 2-D map associated with it, and may be used to display locations on the zone. If zone data files 252 are applicable, each zone may include a zone ID and a short localizable name of the Zone. Such zone data files 252 may be associated with a view projection matrix (4×4) to convert from 3-D world coordinates to a 2-D map position. Such zone data files 252 may be associated with a location change event that indicates an update to a current in-game location of the player. Such location change event may be posted regularly, or whenever the player's in-game location changes significantly. The platform server 120 may store a latest value in 'state.' Such zone data files 252 may include an x, y, z position of the player's character in the zone as well as an a, b, c vector indicating the player's characters orientation or direction. Such zone data files 252 may be associate with an activity start event and/or an activity end event and for the activity end event, an outcome of completed, failed, or abandoned may be associated to the activity (e.g., activity ID).

Such actor data files 254 may be associated with an entity with behaviors in the game, and can be player-controller or game-controlled, and can change dynamically during gameplay. Such actor data files 254 may include an actor ID for the actor, a localizable name for the actor, an image of the actor, and/or a short description of the actor. Such actor data files 254 may be associated with an actor select event that indicates that the player's selected actor(s) have changed. The selected actor(s) may represent the actors the player is controlling in the game and may be displayed on the player's profile and other spaces via the platform server 120. There may be more than one actor selected at time and each game may replace its list of actors upon loading save data.

Such mechanics data files 256 may be associated with an item, skill, or effect that can be used by the player or the game to impact gameplay (e.g., bow, arrow, stealth attack, fire damage) and may exclude items that do no impact gameplay (e.g., collectibles). Such mechanics data files 256 may include a mechanic ID of the mechanic, a short name of the mechanic, an image of the mechanic, and/or a short description of the mechanic. Such mechanics data files 256 may be associated with a mechanic availability change event that indicates that the mechanics available to the player have changed. Available may mean that the mechanic is available in the game world for the player to use, but may require the player to go through some steps to acquire it into inventory (e.g., buy from a shop, pick up from the world) before using it. Each game may replace its list of mechanics upon loading save data.

Such mechanics data files 256 may be associated with a mechanic inventory change event that indicates that the player's inventory has changed. Inventory may refer to mechanics that are immediately usable to the player without having to take additional steps in the game before using it. Inventory information is used to estimate a player's readiness for various activities, which may be forwarded to the platform server 120. Games may replace its list of mechanic inventory upon loading save data. Mechanics on cool down may be considered part of the inventory. Mechanic counts (e.g., ammunition, healing points) with any non-zero value may be treated as "in inventory." Inventory mechanics may be considered a subset of available mechanics.

Such mechanics data files 256 may be associated with a mechanic use event that indicates that a mechanic has been used by or against the player and may be used to be displayed as mechanic usage in a UGC context. Such mechanics data files 256 may include a list or array of mechanics that were used (e.g, fire arrow, fire damage) or whether an initiator is the player, such that whether the mechanics were used by or against the player. Such mechanics data files 256 may include an initiator actor ID, a current zone ID of the initiator actor, and/or a current x, y, z position of the initiator actor. Such mechanics data files 256 may be associated with a mechanic impact event that indicates that a mechanic had impact on gameplay (e.g., an arrow hit an enemy) and may be used to display mechanic image in a UGC context. Mechanic use and mechanic image events may be not linked. Such mechanics data files 256 may include the initiator action ID, the current zone ID of the initiator actor, the current x, y, z position of the initiator actor, a target actor ID, a current zone ID of the target actor, a current x, y, z of the target actor, and a mitigation mechanic that may mitigate the initiator mechanic.

Such game media data files 258 may be include a game media ID of the game media, a localizable name for the game media, a media format (e.g., image, audio, video, text, etc.), a category or type of media (cut-scene, audiolog, poster, developer commentary, etc.), a URL or a server-provisioned media file, and/or whether the game media is associated with a particular activity. Such game media data files 258 may be associated with a game media start event that indicates that a particular piece of game media has started in the game right now and a game media end event that indicates that the particular piece of game media has ended.

Object data (e.g., activity data, zone data, actor data, mechanics data, etc.) may be associated with one another to form object-object associations. The object data may also be associated with the media files (e.g., media file 212) and for media-object bindings. These object-object associations and media-object bindings, along with other associations made with respect to aspects (e.g., activities, actors, actions, etc.) displayed in the media, may indicate particular patterns such that future object data may be predicted based on such associations that form object aggregations. Object aggregations may form one or more relationships between the object data through algorithms, logic functions, statistical analysis, and other dataset analyses.

Figure 3:
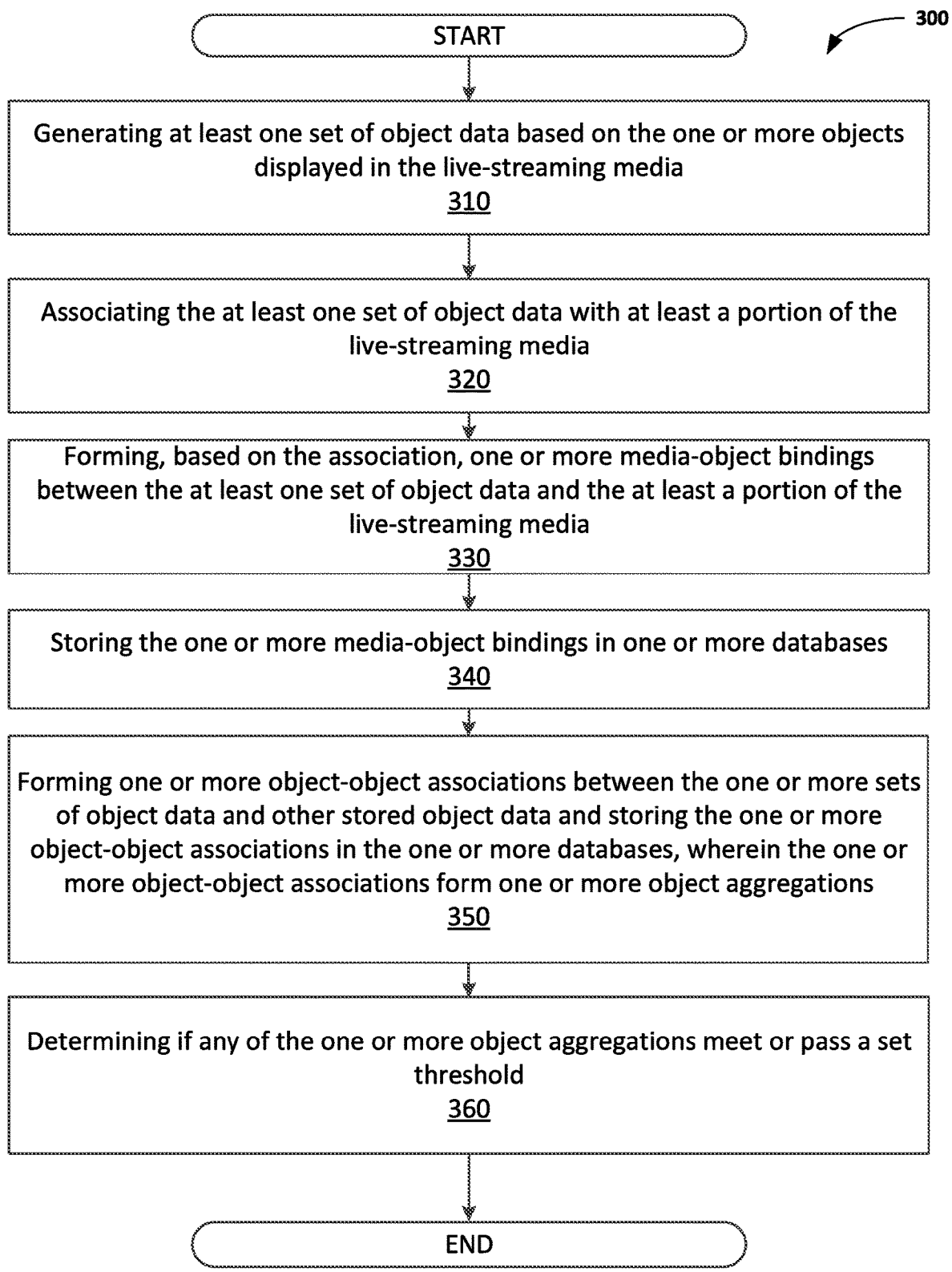
FIG. 3 illustrates a flowchart of an example method for predicting performance in a media, according to an aspect of the present disclosure.

FIG. 3 is a flowchart illustrating an exemplary method 300 for media-object binding and predicting performance in a media. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 3 are performed in the cloud). The steps identified in FIG. 3 (and the order thereof) are exemplary and may include various alternatives, equivalents, or derivations thereof including but not limited to the order of execution of the same.

In step 310, at least one set of object data (e.g., at least one activity file 216) generated based on the one or more objects displayed in the live-streaming media (e.g., a media file 212). In step 320, the at least one set of object data is associated with at least a portion of the live-streaming media. The at least one set of object data comprises data about the one or more objects displayed in real-time in the live-streaming media. Such association or binding may be based on at least one timestamp of the set of object data associated with one or more timestamps (e.g., a content time stamp file 214) of the live-streaming media. In addition to or alternatively, such association or binding may be based on an activity ID of the set of object data associated with a media ID of the live-streaming media, wherein the set of object data may also include data about the one or more objects displayed during at least a portion of the live-streaming media (e.g., activity results, activity types (e.g., competitive match, quest, task, etc.), user or peer data related to the activity). The set of object data may also include a direct link to the associated object. Such link allows a user to directly access an object. For example, a user may wish to participate in an activity associated with the object shown by a live-streaming media. In the same example, the user can select an option to play the activity shown, and the activity may be automatically launched after selection by the user.

In step 330, based on the association, one or more media-object bindings are formed between the at least one set of object data and the at least a portion of the live-streaming media. In step 340, the one or more media-object bindings are stored in the database 140 or the user devices 130 by the media streaming servers 110 or the platform servers 120. The live-streaming media may be part of an interactive content title 230 or may be UGC (e.g., help video, screen shots, videos, commentary, mashups, etc.) generated by the user, peers, a publisher of the media content title, or a third party. One or more user profiles may also be stored in the database 140 or the user devices 130 by the media streaming servers 110 or the platform servers 120. In step 350, the real-time activity information associated with the at least one set of object data may be displayed in association with the live-streaming media.

In step 350, one or more object-object associations between the one or more sets of object data and other stored object data may be formed and stored in the one or more databases, which may include an algorithm library. The one or more object-object associations may form one or more object aggregations. The one or more object aggregations may also take into consideration user input. As mentioned above, object aggregations may be formed by evaluations of the object-object associations based on algorithms from the algorithm library and ran in an experiment module.

In step 360, a determination may be made if any of the one or more object aggregations meet or pass a set threshold. When the set threshold is met or passed, the media may suggest to an associated user to stream the media in real-time if the media is not a live-streaming media. Alternatively, the media is a live-streaming media. The set threshold may be a fastest completion time of reaching a milestone of a previous session, wherein the determination of passing the set threshold calculates and compares a predicted completion time, based on an acceleration calculated over a period of time of a current session, with a fastest completion time. The set threshold may be calculated after a percentage completion of the milestone. The set threshold may change as more object-object associations are saved and/or different object aggregations are formed. The set threshold may be dynamic depending on any number of factors such as a player's skill level, play mode, game, character, etc. The milestone may be a completion of a task, a level, a mission, speed runs, kill count, or any other kind of gameplay milestone. The milestone may also be the result of any gameplay activity that an individual can perform or can perform with one more friends simultaneously or asynchronously. The milestone may be any game behavior exhibited that can be measured and have a related threshold independent of genre or platform. The set threshold may also be calculated by determining a speed at which the player is reaching the milestone and compare the speed at which the player is reaching the milestone based on object data timestamps and stored object data timestamps of other players.

The one or more sets of object data may be compared to the other stored object data along with associated timestamps to determine the acceleration. The other stored object data, object-object associations, media-object bindings, and object aggregations may be inputs to one or more algorithms for calculating whether the set threshold is met or passed. The set threshold may be a velocity threshold wherein the determination of passing the set threshold calculates and compares the velocity at which a milestone is being reached in a current session and a fastest recorded velocity at which the milestone was reached of a previous session. The set threshold may be used for a "beat best time/world record" type of scenario. Additional, the set threshold may be used to signal trend improvements over time, wherein the set threshold is used for a "beat persona record" type of scenario or other kinds of measurements against own past performance over various period of time. The set threshold may also be used as a training mechanism as well as for novelty interest overall. For example, most players' gameplay deaths may average within a certain time period, such as an hour period. Therefore, if a player has surpassed the average gameplay session, it could be a point of interest and a reason viewers might be drawn to watch such a stream. In a broader view, a novelty interest may mean a range of business logic that can be included for predicting various results. The determination may be calculated after a percentage completion of the milestone. The determination if any object aggregation passes the set threshold may be determined by inputting one or more of the object aggregations with one or more algorithms from the algorithm library into the experiment module to evaluate whether any of the one or more object aggregations pass the set threshold.

An indicator may be display, with the media, that a milestone is being reached at or above the set threshold at which the milestone was reached in previous sessions. The set thresholds may be provided by third-party game publishers, and records of velocities and accelerations of reaching selected milestones are stored at the one or more databases. In addition, the media may be television broadcasting and the milestone being reached may be that of what is occurring in the television broadcasting.

Additionally, list results may be displayed comprising at least one matching media having matching object data. A list of streaming media where the set threshold is met may be displayed, wherein the list is ordered based on velocity or acceleration of gameplay of respective current sessions. The list results may be an aggregation from various games and players or may be filtered into particular games, skill levels, or other kinds of factors. Live broadcasted games with performance acceleration that has surpassed their respective thresholds may be of interest to viewers that want to see players attain record-breaking goals such as reaching certain goals at a record-breaking time. The list results, or elsewhere, may display a link to an associate media having an object aggregation that passes the set threshold. The media may display an indicator in the media that a milestone is being reaches at the set threshold acceleration based on velocities at which other players have reached the milestone.

Figure 4:
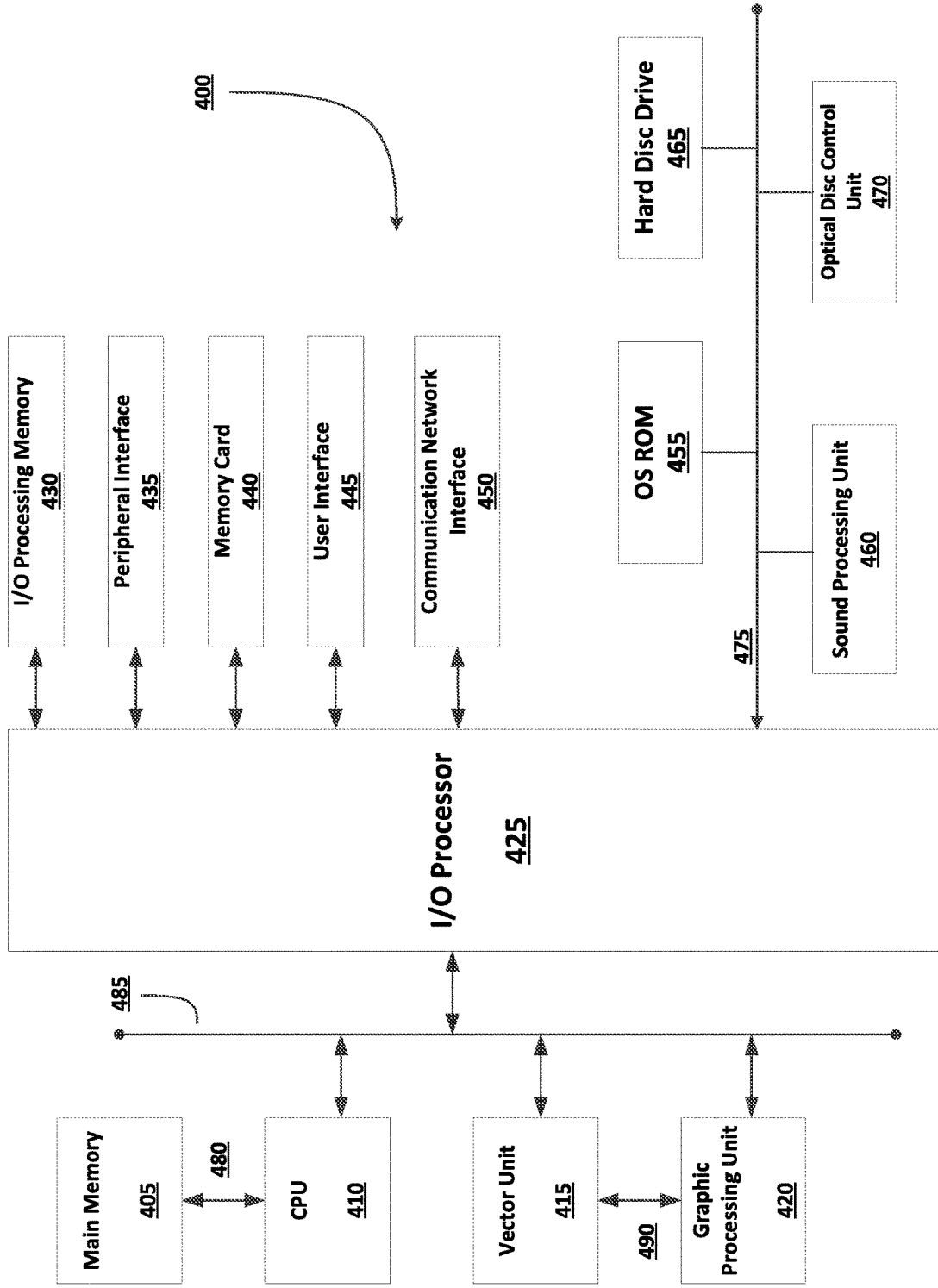
FIG. 4 illustrates an example electronic entertainment system that may be used in predicting performance and measuring performance acceleration or velocity in a media using media-object binding, according to an aspect of the present disclosure.

FIG. 4 is an exemplary user electronic entertainment system that may be used in launching interactive content and providing dynamic interfaces. The entertainment system 400 of FIG. 4 includes a main memory 405, a central processing unit (CPU) 410, vector unit 415, a graphics processing unit 420, an input/output (I/O) processor 425, an I/O processor memory 430, a peripheral interface 435, a memory card 440, a Universal Serial Bus (USB) interface 445, and a communication network interface 450. The entertainment system 400 further includes an operating system read-only memory (OS ROM) 455, a sound processing unit 460, an optical disc control unit 470, and a hard disc drive 465, which are connected via a bus 475 to the I/O processor 425.

Entertainment system 400 may be an electronic game console. Alternatively, the entertainment system 400 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 410, the vector unit 415, the graphics processing unit 420, and the I/O processor 425 of FIG. 4 communicate via a system bus 485. Further, the CPU 410 of FIG. 4 communicates with the main memory 405 via a dedicated bus 480, while the vector unit 415 and the graphics processing unit 420 may communicate through a dedicated bus 490. The CPU 410 of FIG. 4 executes programs stored in the OS ROM 455 and the main memory 405. The main memory 405 of FIG. 4 may contain pre-stored programs and programs transferred through the I/O Processor 425 from a CD-ROM, DVD-ROM, or other optical disc (not shown) using the optical disc control unit 470. I/O Processor 425 of FIG. 4 may also allow for the introduction of content transferred over a wireless or other communications network (e.g., 4G, LTE, 1G, and so forth). The I/O processor 425 of FIG. 4 primarily controls data exchanges between the various devices of the entertainment system 400 including the CPU 410, the vector unit 415, the graphics processing unit 420, and the peripheral interface 435.

The graphics processing unit 420 of FIG. 4 executes graphics instructions received from the CPU 410 and the vector unit 415 to produce images for display on a display device (not shown). For example, the vector unit 415 of FIG. 4 may transform objects from three-dimensional coordinates to two-dimensional coordinates, and send the two-dimensional coordinates to the graphics processing unit 420. Furthermore, the sound processing unit 460 executes instructions to produce sound signals that are outputted to an audio device such as speakers (not shown). Other devices may be connected to the entertainment system 400 via the USB interface 445, and the communication network interface 450 such as wireless transceivers, which may also be embedded in the system 400 or as a part of some other component such as a processor.

A user of the entertainment system 400 of FIG. 4 provides instructions via the peripheral interface 435 to the CPU 410, which allows for use of a variety of different available peripheral devices (e.g., controllers) known in the art. For example, the user may instruct the CPU 410 to store certain game information on the memory card 440 or other non-transitory computer-readable storage media or instruct a character in a game to perform some specified action.

The present disclosure pertain to an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. Aspects of the present disclosure may also be implemented with cross-title neutrality and/or may be utilized across a variety of titles from various publishers.

Aspects of the present disclosure may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as other network interfaces and network topologies to implement the same.

In some aspects of the present disclosure, computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

The foregoing detailed description of the technology has been presented for purposes of illustration and description. It is not intended to be exhaustive or to limit the technology to the precise form disclosed. Many modifications and variations are possible in light of the above teaching. The described aspects of the present disclosure were chosen in order to adequately explain the principles of the technology, its practical application, and to enable others skilled in the art to utilize the technology along with various modifications as are suited to the particular use contemplated. It is intended that the scope of the technology be defined by the claim.

What is claimed is:

1. A method of predicting performance in a media based on media-object binding, the method comprising:
   storing, in one or more databases in memory, one or more sets of object data, media-object bindings between stored object data and the media, object-object associations between object data, and object aggregations formed by evaluations formed by evaluations of the object-object associations; and
   executing instructions stored in memory, wherein execution of the instructions by one or more processors:
      associates one or more sets of object data with the media, wherein the one or more sets of object data comprises data about one or more objects being displayed in the media;
      forms, based on the associating, one or more media-object bindings between the one or more sets of object data and the media, wherein the one or more media-object bindings are stored in the one or more databases;
      forms one or more object-object associations between the one or more sets of object data and other stored object data and storing the one or more object-object associations in the one or more databases, wherein the one or more object-object associations form one or more object aggregations; and
      determines if any of the one or more object aggregations at least meet a set threshold.

2. The method of claim 1, further comprising making a suggestion via the media that is displayed to an associated user, the displayed suggestion including a link for streaming the media in real-time when the set threshold is determined to have at least been met.

3. The method of claim 1, wherein the media is a live-streaming media.

4. The method of claim 1, wherein the set threshold is a fastest completion time of reaching a milestone of a previous session, wherein the determination includes comparing a predicted completion time, based on an acceleration calculated over a period of time of a current session, with the fastest completion time.

5. The method of claim 4, further comprising comparing the one or more sets of object data to the other stored object data along with associated timestamps to determine the acceleration.

6. The method of claim 1, wherein the other stored object data, the object-object associations, the media-object bindings, and the object aggregations are inputs to one or more algorithms for calculating whether the set threshold is at least met.

7. The method of claim 1, wherein the set threshold is a velocity threshold, wherein the determination includes comparing a velocity at which a milestone is being reach in a current session and a fastest recorded velocity at which the milestone was reached of a previous session, and wherein the determination is calculated after a percentage completion of the milestone.

8. The method of claim 1, further comprising displaying, with the media, an indicator that a milestone is being reached at or above the set threshold at which the milestone was reached in previous sessions.

9. The method of claim 1, wherein thresholds are provided by third-party sources, and records of velocities and accelerations of reaching selected milestones are stored at the one or more databases.

10. A system for predicting performance in a media based on media-object binding, the system comprising:
    one or more databases that store sets of object data, media-object bindings between stored object data and the media, object-object associations between object data, and object aggregations formed by evaluations of the object-object associations; and
    one or more processors that execute instructions stored in memory, wherein execution of the instructions by the one or more processors:
        associates one or more sets of object data with the media, wherein the one or more sets of object data comprises data about one or more objects being displayed in the media;
        forms, based on the associating, one or more media-object bindings between the one or more sets of object data and the media, wherein the one or more media-object bindings are stored in the one or more databases;
        forms one or more object-object associations between the one or more sets of object data and other stored object data and stores the one or more object-object associations in the one or more databases, wherein the one or more object-object associations form one or more object aggregation; and
        determines if any of the one or more object aggregations meet or pass a set threshold.

11. The system of claim 10, wherein the processors execute further instructions to make a suggestion via the media that is displayed to an associated user, the displayed suggestion including a link for streaming the media in real-time when the set threshold is determined to have at least been met.

12. The system of claim 10, wherein the media is a live-streaming media.

13. The system of claim 10, wherein the one or more databases further comprises an algorithm library and an experiment module, wherein the one or more object aggregations are formed by the evaluations of the object-object associations in the experiment module.

14. The system of claim 13, wherein the determination includes inputting one or more of the one or more object aggregations with one or more algorithms from the algorithm library into the experiment module to evaluate whether any of the one or more object aggregations pass the set threshold.

15. The system of claim 10, wherein the set threshold is a fastest completion time of reaching a milestone of a previous session, wherein the determination includes comparing a predicted completion time, based on an acceleration calculated over a period of time of a current session, with the fastest completion time.

16. The system of claim 15, wherein the processors execute further instructions to compare one or more sets of object data to the other stored object data along with associated timestamps to determine the acceleration.

17. The system of claim 10, wherein the other stored object data, the object-object associations, the media-object bindings, and the object aggregations are inputs to one or more algorithms for calculating whether the set threshold is at least met.

18. A non-transitory computer-readable storage medium having embodied thereon a program executable by one or more processors to perform a method for predicting performance in a media based on media-object binding, the method comprising:
    associating one or more sets of object data with the media, wherein the one or more sets of object data comprises data about one or more objects being displayed in the media;
    forming, based on the associating, one or more media-object bindings between the one or more sets of object data and the media, wherein the one or more media-object bindings are stored in one or more databases;
    forming one or more object-object associations between the one or more sets of object data and other stored object data and storing the one or more object-object associations in the one or more databases, wherein the one or more object-object associations form one or more object aggregations; and
    determining if any of the one or more object aggregations meet or pass a set threshold.

19. The method non-transitory computer-readable storage medium of claim 18, further comprising instructions executable to make a suggestion via the media that is displayed to an associated user, the displayed suggestion including a link for streaming the media in real-time.

20. The non-transitory computer-readable storage medium of claim 18, wherein the media is a live-streaming media.

21. The non-transitory computer-readable storage medium of claim 18, wherein the set threshold is a fastest completion time of reaching a milestone of a previous session, wherein the determination includes comparing a predicted completion time, based on an acceleration calculated over a period of time of a current session, with the fastest completion time.

22. The non-transitory computer-readable storage medium of claim 21, wherein the milestone is a completion of a task, a level, a mission, speed runs, or kill count.

23. The non-transitory computer-readable storage medium of claim 18, wherein the other stored object data, object-object associations, media-object bindings, and object aggregations are inputs to one or more algorithms for calculating whether the set threshold is at least met.

24. The non-transitory computer-readable storage medium of claim 18, wherein the set threshold is a velocity threshold wherein the determination includes comparing a velocity at which a milestone is being reach in a current session and a fastest recorded velocity at which the milestone was reached of a previous session, wherein the determination is calculated after a percentage completion of the milestone.

25. The non-transitory computer-readable storage medium of claim 18, further comprising instructions executable to display a list of streaming media where the set threshold is at least met, wherein the list is ordered based on velocity or acceleration of gameplay of respective current sessions.

* * * * *